United States Patent
Radakovic et al.

(10) Patent No.: US 12,510,370 B2
(45) Date of Patent: Dec. 30, 2025

(54) METHOD, APPARATUS, AND COMPUTER PROGRAM PRODUCT FOR DETERMINING BENEFIT OF RESTRICTED TRAVEL LANE

(71) Applicant: HERE GLOBAL B.V., Eindhoven (NL)

(72) Inventors: Daniela Radakovic, Chicago, IL (US); Arnold Sheynman, Northbrook, IL (US); Kyle Jackson, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 473 days.

(21) Appl. No.: 17/645,385

(22) Filed: Dec. 21, 2021

(65) Prior Publication Data

US 2022/0205799 A1    Jun. 30, 2022

Related U.S. Application Data

(60) Provisional application No. 63/132,154, filed on Dec. 30, 2020.

(51) Int. Cl.
*G01C 21/30* (2006.01)
*G01C 21/34* (2006.01)
(Continued)

(52) U.S. Cl.
CPC ......... *G01C 21/3492* (2013.01); *G01C 21/30* (2013.01); *G01C 21/3691* (2013.01);
(Continued)

(58) Field of Classification Search
CPC ................ G01C 21/3492; G01C 21/30; G01C 21/3691; G08G 1/0112; G08G 1/052;
(Continued)

(56) References Cited

U.S. PATENT DOCUMENTS 8,452,771 B2   5/2013   Kurciska et al.
2005/0079878 A1*   4/2005   Smith ............... G08G 1/0104
                                                                  455/456.1

(Continued)

OTHER PUBLICATIONS

"Establishing Monitoring Programs for Travel Time Reliability", SHRP 2 Reliability Project L02, National Academies of Sciences, Engineering, and Medicine, (Jan. 31, 2013), 167 pages.

*Primary Examiner* — Scott A Browne
*Assistant Examiner* — Terry C Buse
(74) *Attorney, Agent, or Firm* — ALSTON & BIRD LLP

(57) ABSTRACT

A method, apparatus, and computer program product are provided for evaluating traffic conditions across a plurality of lanes to determine whether it is advantageous to travel in the restricted travel lane. Methods may include: receiving a plurality of probe data points, each probe data point received from a probe apparatus of a plurality of probe apparatuses; map-matching the probe data points of the plurality of probe apparatuses to a road segment of a road network; determining a distance of each probe data point from a centerline of the road segment; determining a range of distances for the probe data points from the centerline of the road segment; dividing the range of distances into a predefined number of spatial bins; identifying a speed associated with each spatial bin; and determining a restricted travel lane benefit based on an analysis of the speeds of each spatial bin.

20 Claims, 9 Drawing Sheets

(51) Int. Cl.
    *G01C 21/36*     (2006.01)
    *G08G 1/01*     (2006.01)
    *G08G 1/052*     (2006.01)
    *B60W 60/00*     (2020.01)

(52) U.S. Cl.
    CPC ........... *G08G 1/0112* (2013.01); *G08G 1/052* (2013.01); *B60W 60/001* (2020.02); *B60W 2552/10* (2020.02); *B60W 2554/4042* (2020.02)

(58) Field of Classification Search
    CPC ....... B60W 2554/4042; B60W 60/001; B60W 2552/10
    See application file for complete search history.

(56) References Cited

U.S. PATENT DOCUMENTS

| | | | |
|---|---|---|---|
| 2006/0229800 A1* | 10/2006 | Aronin | G08G 1/00 340/936 |
| 2007/0208501 A1 | 9/2007 | Downs et al. | |
| 2016/0035219 A1* | 2/2016 | Stenneth | G01C 21/3819 701/400 |
| 2018/0174443 A1* | 6/2018 | Fowe | G08G 1/012 |
| 2022/0119016 A1* | 4/2022 | Rajvanshi | B60W 60/0059 |
| 2023/0360017 A1* | 11/2023 | Borras | G08G 1/052 |

\* cited by examiner

METHOD, APPARATUS, AND COMPUTER PROGRAM PRODUCT FOR DETERMINING BENEFIT OF RESTRICTED TRAVEL LANE

CROSS-REFERENCE TO RELATED APPLICATIONS

This application claims priority to U.S. Provisional Application Ser. No. 63/132,154, filed on Dec. 30, 2020, the contents of which are hereby incorporated by reference in their entirety.

TECHNOLOGICAL FIELD

An example embodiment of the present invention relates to determining the benefit of traveling in a restricted travel lane relative to unrestricted travel lanes, and more particularly, to evaluating traffic conditions across a plurality of lanes to determine whether it is advantageous to travel in the restricted travel lane.

BACKGROUND

Maps have been used for centuries for providing route geometry and geographical information. Conventional paper maps including static images of roadways and geographic features from a snapshot in history have given way to digital maps presented on computers and mobile devices. These digital maps can be updated and revised such that users have the most-current maps available to them each time they view a map hosted by a mapping service server. Digital maps can further be enhanced with dynamic information, such as vehicle speed profile information based on historical speed profiles of vehicles traveling among a road network.

Vehicle and traffic data that is provided on digital maps is generally based on crowd-sourced data from mobile devices or probe data. The traffic data is typically reflective of a collective group of mobile devices traveling along a road segment, and may be useful in vehicle navigation applications in order for a user to avoid heavy or slow traffic routes between an origin and a destination. However, dynamic computation of traffic speeds along routes can often suffer from shortcomings such as identifying traffic speeds inaccurately with low latency and with high accuracy and high latency.

BRIEF SUMMARY

A method, apparatus, and computer program product are provided in accordance with an example embodiment for determining the benefit of a restricted travel lane relative to unrestricted travel lanes, and more particularly, to evaluating traffic conditions across a plurality of lanes to determine whether it is advantageous to travel in the restricted travel lane. Embodiments may include an apparatus having processing circuitry and at least one memory including computer program code, the at least one memory and computer program code configured to, with the processing circuitry, cause the apparatus to: receive a plurality of probe data points, each probe data point received from a probe apparatus of a plurality of probe apparatuses; map-match the probe data points of the plurality of probe apparatuses to a road segment of a road network; determine a distance of each probe data point from a line extending longitudinally along the road segment; determine a range of distances for the probe data points from the line extending longitudinally along of the road segment; divide the range of distances into a predefined number of spatial bins; identify a speed associated with each spatial bin; and determine a restricted travel lane benefit in response to the speed associated with each of at least two of the spatial bins on a predetermined side of the line extending longitudinally along of the road segment including a first speed for a first bin of the at least two spatial bins and a second speed for a second bin of the at least two spatial bins, where the first speed is at least a predetermined amount faster than the second speed, and in response to the first bin corresponding to a lane furthest from the line extending longitudinally along the road segment.

According to some embodiments, each probe data point includes a speed, where causing the apparatus to identify a speed associated with each spatial bin includes causing the apparatus to: assign respective probe data points to a respective spatial bin based on a distance of the respective probe data point from the line extending longitudinally along of the road segment; and calculate an average speed of the probe data points assigned to each spatial bin to identify the speed associated with each spatial bin. The predetermined amount of some embodiments is twenty five percent. The road segment includes a multi-lane road segment having at least one travel-restricted travel lane. The predetermined side of the line extending longitudinally along of the road segment includes the at least one restricted travel lane. The apparatus of some embodiments is caused to provide route guidance to at least one of a driver of a vehicle or an autonomous control of a vehicle based on the restricted travel lane benefit. The apparatus of some embodiments may be caused to provide an indication of the restricted travel lane benefit to an occupant of a vehicle and a cost associated with the restricted travel lane benefit.

According to some embodiments, a computer program product is provided including at least one non-transitory computer-readable storage medium having computer-executable program code portions stored therein, the computer-executable program code portions including program code instructions configured to: receive a plurality of probe data points, each probe data point received from a probe apparatus of a plurality of probe apparatuses; map-match the probe data points of the plurality of probe apparatuses to a road segment of a road network; determine a distance of each probe data point from a line extending longitudinally along of the road segment; determine a range of distances for the probe data points from the line extending longitudinally along of the road segment; divide the range of distances into a predefined number of spatial bins; identify a speed associated with each spatial bin; and determine a restricted travel lane benefit in response to the speed associated with each of at least two of said spatial bins on a predetermined side of the line extending longitudinally along of the road segment including a first speed for a first bin of the at least two spatial bins and a second speed for a second bin of the at least two spatial bins, where the first speed is at least a predetermined amount faster than the second speed, and in response to the first bin corresponding to a lane furthest from the line extending longitudinally along the road segment.

According to some embodiments, each probe data point includes a speed, where the program code instructions to identify a speed associated with each spatial bin includes program code instructions to: assign respective probe data points to a respective spatial bin based in a distance of the respective probe data point from the line extending longitudinally along of the road segment; and calculate an average speed of the probe data points assigned to each spatial bin to identify the speed associated with each spatial bin. The predetermined amount of some embodiments is twenty-five percent. The road segment includes a multi-lane road segment having at least one restricted travel lane. The predetermined side of the line extending longitudinally along of the road segment includes the at least one restricted travel lane. Embodiments may include program code instructions to provide route guidance to at least one of a driver of a vehicle or an autonomous control of a vehicle based on the restricted travel lane benefit. Embodiments may include program code instructions to provide an indication of the restricted travel lane benefit to an occupant of a vehicle and a cost associated with the restricted travel lane benefit.

Embodiments provided herein include a method, with an example method including: receiving a plurality of probe data points, each probe data point received from a probe apparatus of a plurality of probe apparatuses; map-matching the probe data points of the plurality of probe apparatuses to a road segment of a road network; determining a distance of each probe data point from a line extending longitudinally along of the road segment; determining a range of distances for the probe data points from the line extending longitudinally along of the road segment; dividing the range of distances into a predefined number of spatial bins; identifying a speed associated with each spatial bin; and determining a restricted travel lane benefit in response to the speed associated with each of at least two of said spatial bins on a predetermined side of the line extending longitudinally along of the road segment including a first speed for a first bin of the at least two spatial bins and a second speed for a second bin of the at least two spatial bins, where the first speed is at least a predetermined amount faster than the second speed, and in response to the first bin corresponding to a lane furthest from the line extending longitudinally along the road segment.

According to some embodiments, each probe data point includes a speed, where identifying a speed associated with each spatial bin includes assigning respective probe data points to a respective spatial bin based on a distance of the respective probe data point from the line extending longitudinally along of the road segment; and calculating an average speed of the probe data points assigned to each spatial bin to identify the speed associated with each spatial bin. The predetermined amount of some embodiments is twenty-five percent. The road segment includes a multi-lane road segment having at least one restricted travel lane. The predetermined side of the line extending longitudinally along of the road segment includes the at least one restricted travel lane. Methods may include providing route guidance to at least one of a driver of a vehicle or an autonomous control of a vehicle based on the restricted travel lane benefit.

Embodiments provided herein include an apparatus, with an example apparatus including: means for receiving a plurality of probe data points, each probe data point received from a probe apparatus of a plurality of probe apparatuses; means for map-matching the probe data points of the plurality of probe apparatuses to a road segment of a road network; means for determining a distance of each probe data point from a line extending longitudinally along of the road segment; means for determining a range of distances for the probe data points from the line extending longitudinally along of the road segment; means for dividing the range of distances into a predefined number of spatial bins; identifying a speed associated with each spatial bin; and means for determining a restricted travel lane benefit in response to the speed associated with each of at least two of said spatial bins on a predetermined side of the line extending longitudinally along of the road segment including a first speed for a first bin of the at least two spatial bins and a second speed for a second bin of the at least two spatial bins, where the first speed is at least a predetermined amount faster than the second speed, and in response to the first bin corresponding to a lane furthest from the line extending longitudinally along the road segment.

According to some embodiments, each probe data point includes a speed, where the means for identifying a speed associated with each spatial bin includes means for assigning respective probe data points to a respective spatial bin based on a distance of the respective probe data point from the line extending longitudinally along of the road segment; and means for calculating an average speed of the probe data points assigned to each spatial bin to identify the speed associated with each spatial bin. The predetermined amount of some embodiments is twenty-five percent. The road segment includes a multi-lane road segment having at least one restricted travel lane. The predetermined side of the line extending longitudinally along of the road segment includes the at least one restricted travel lane. The apparatus may include means for providing route guidance to at least one of a driver of a vehicle or an autonomous control of a vehicle based on the restricted travel lane benefit.

BRIEF DESCRIPTION OF THE DRAWINGS

Figure 1:
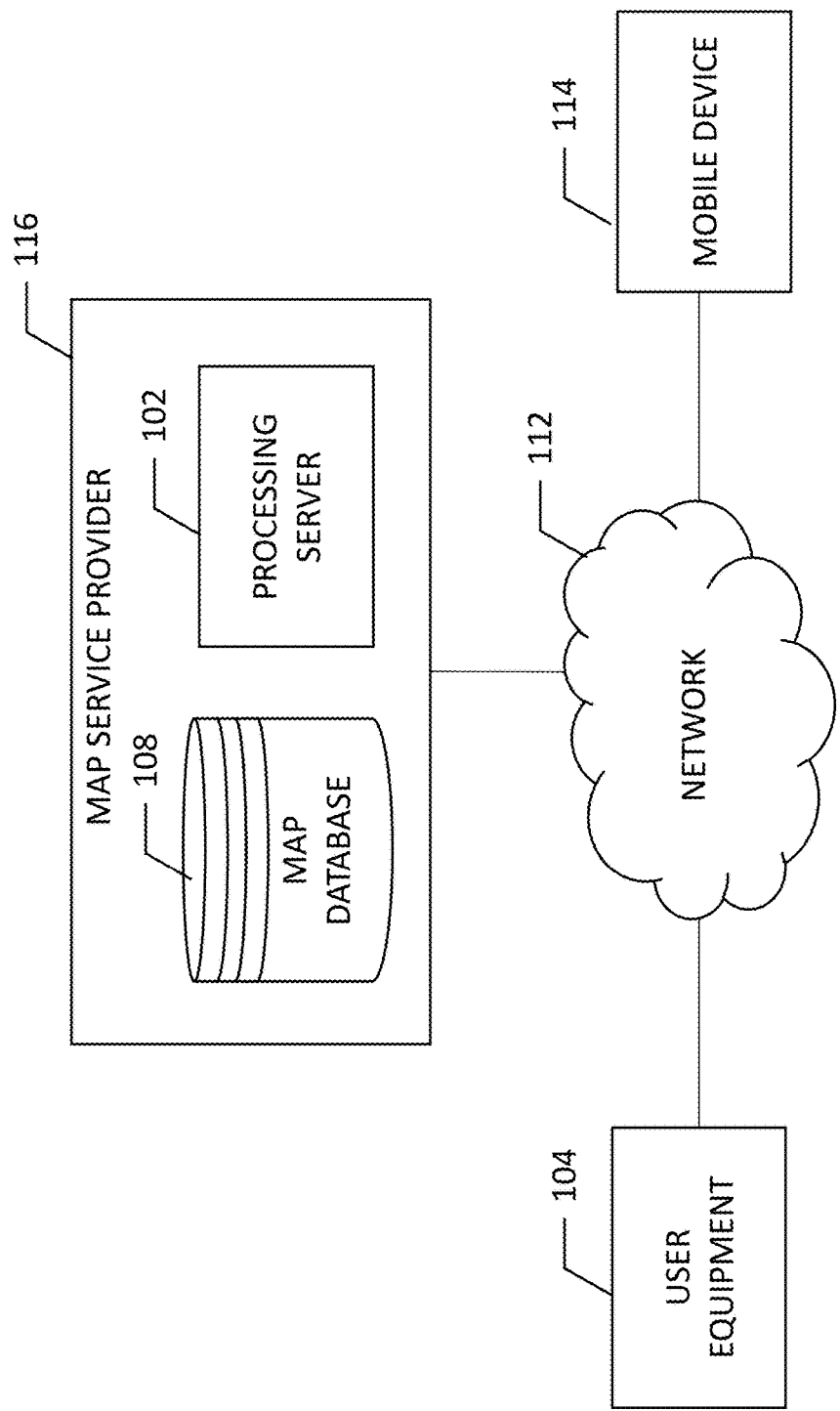
Figure 2:
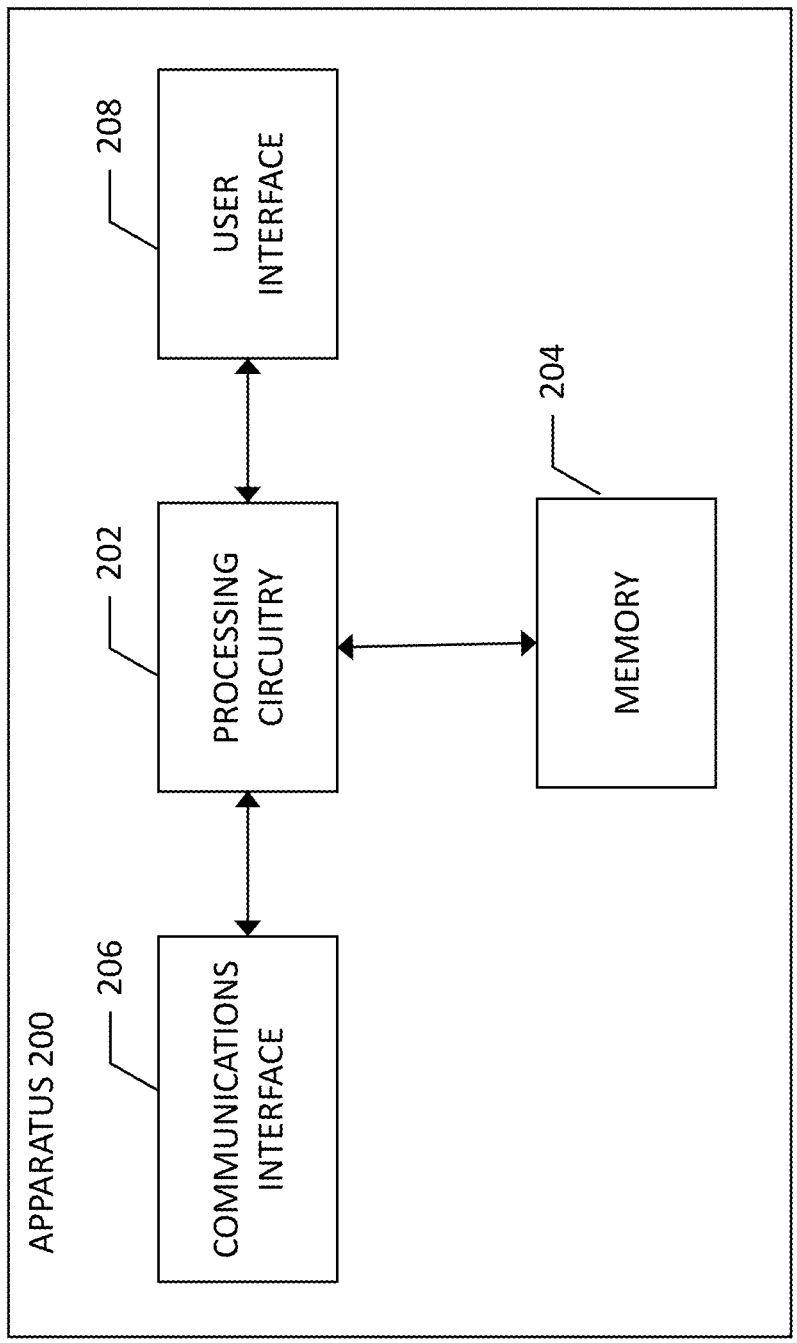
Figure 3:
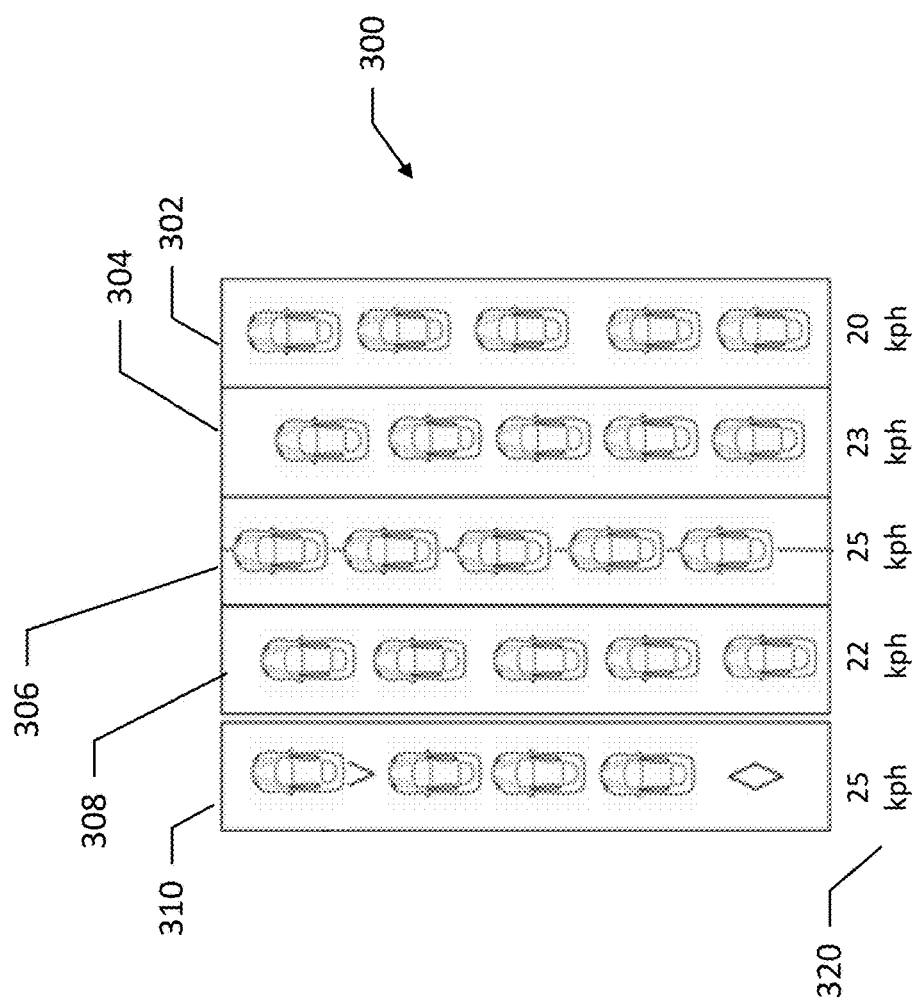
Figure 4:
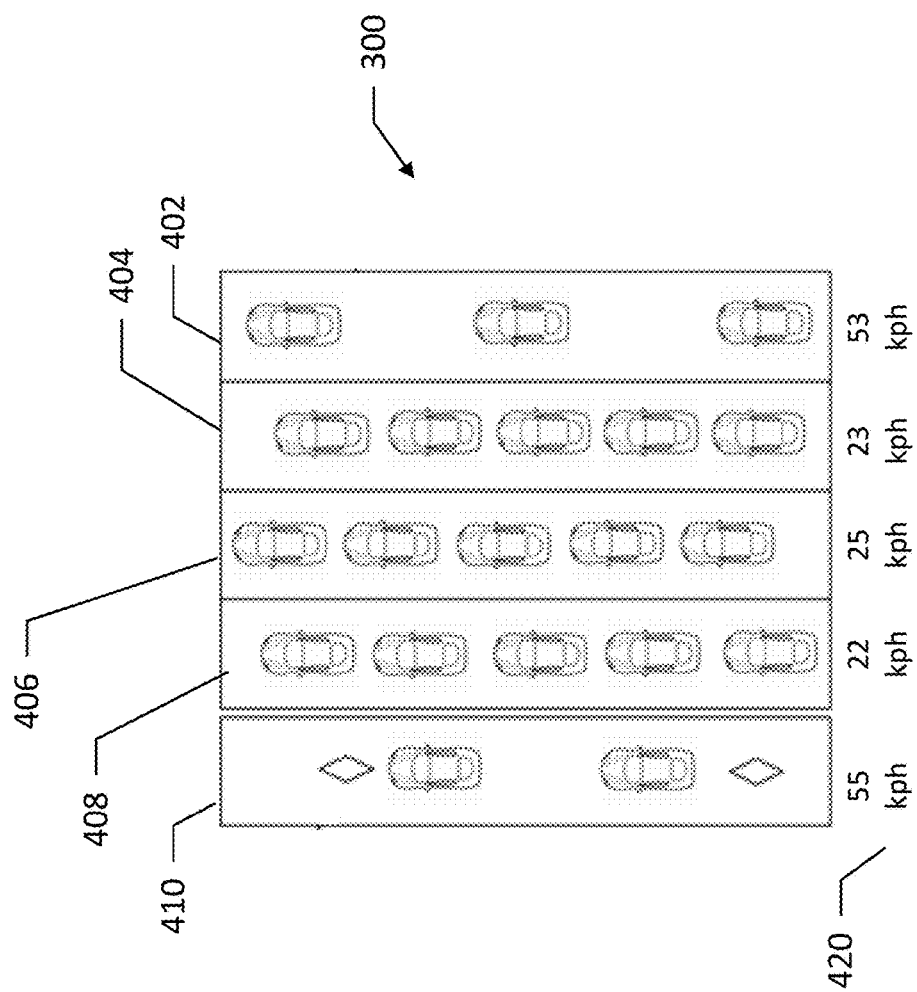
Figure 5:
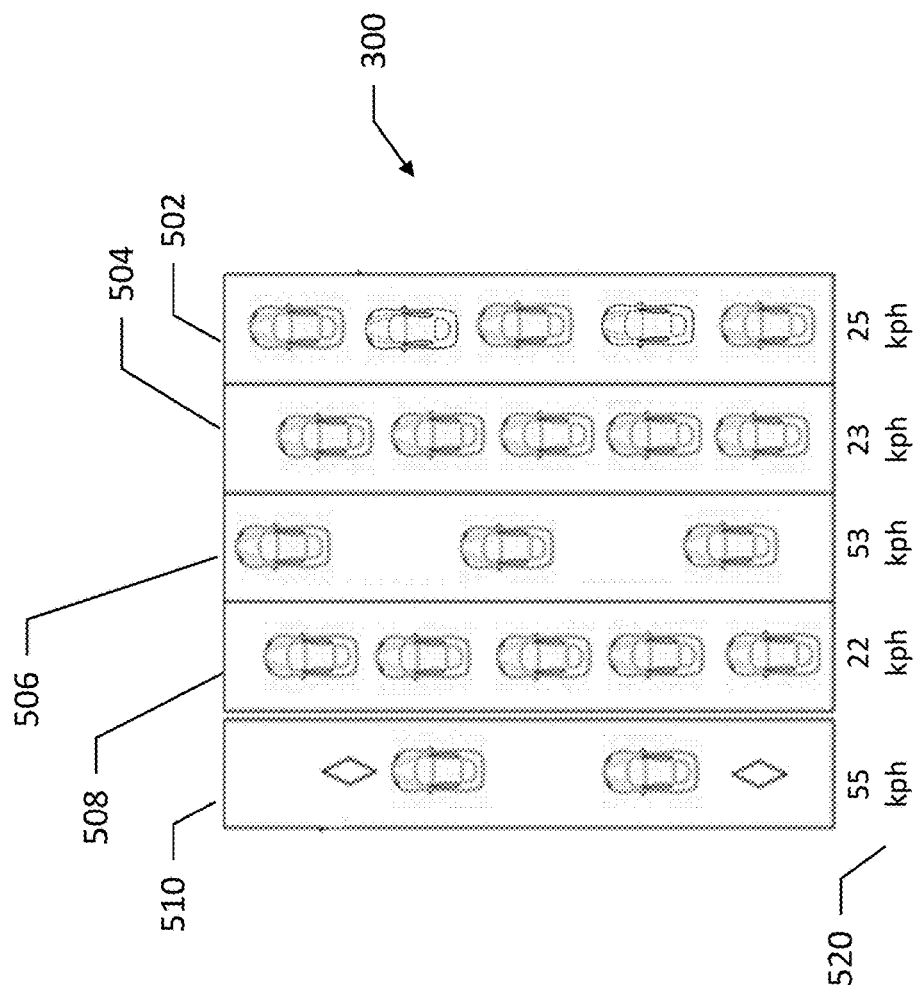
Figure 6:
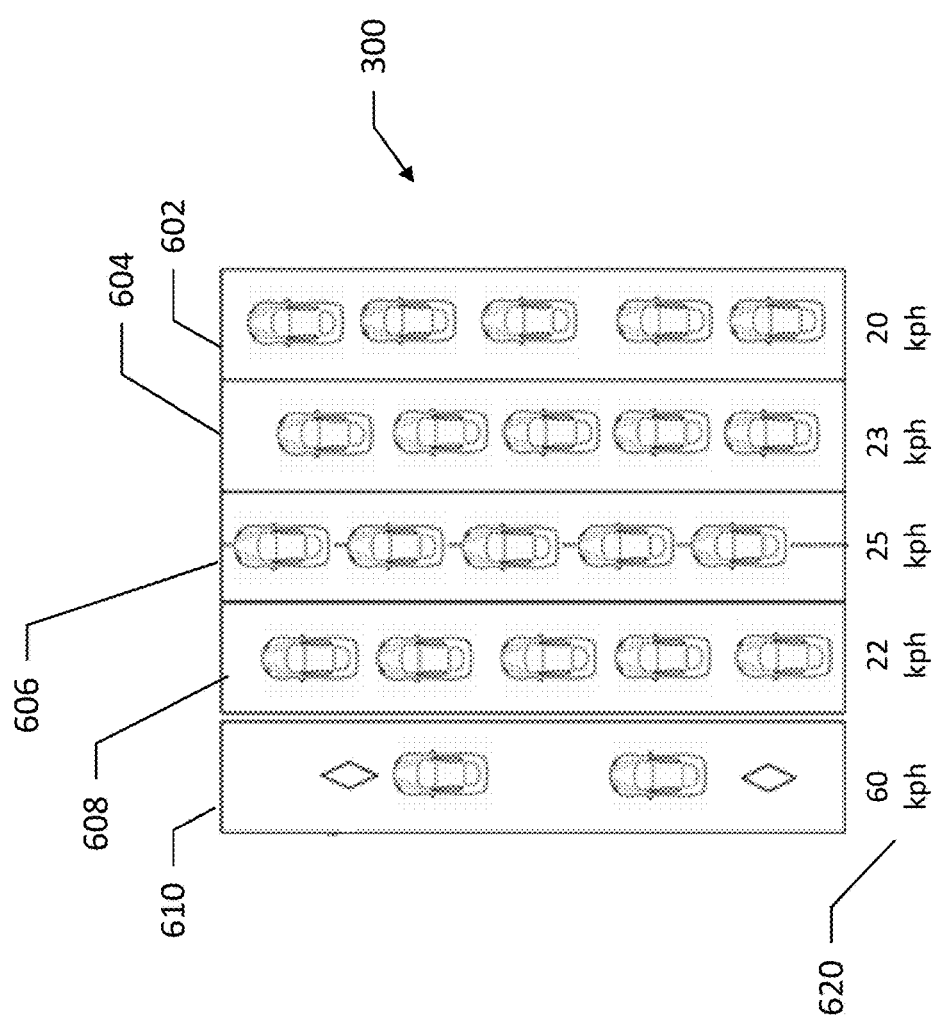
Figure 7:
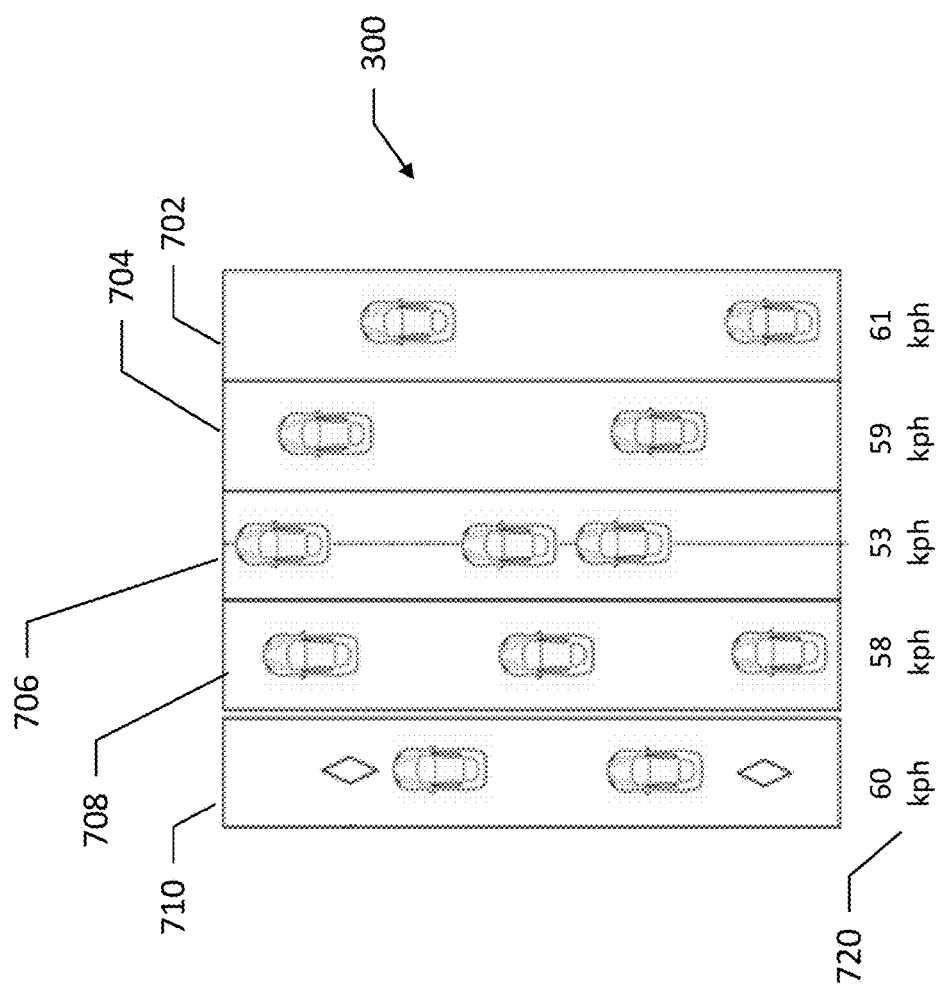
Figure 8:
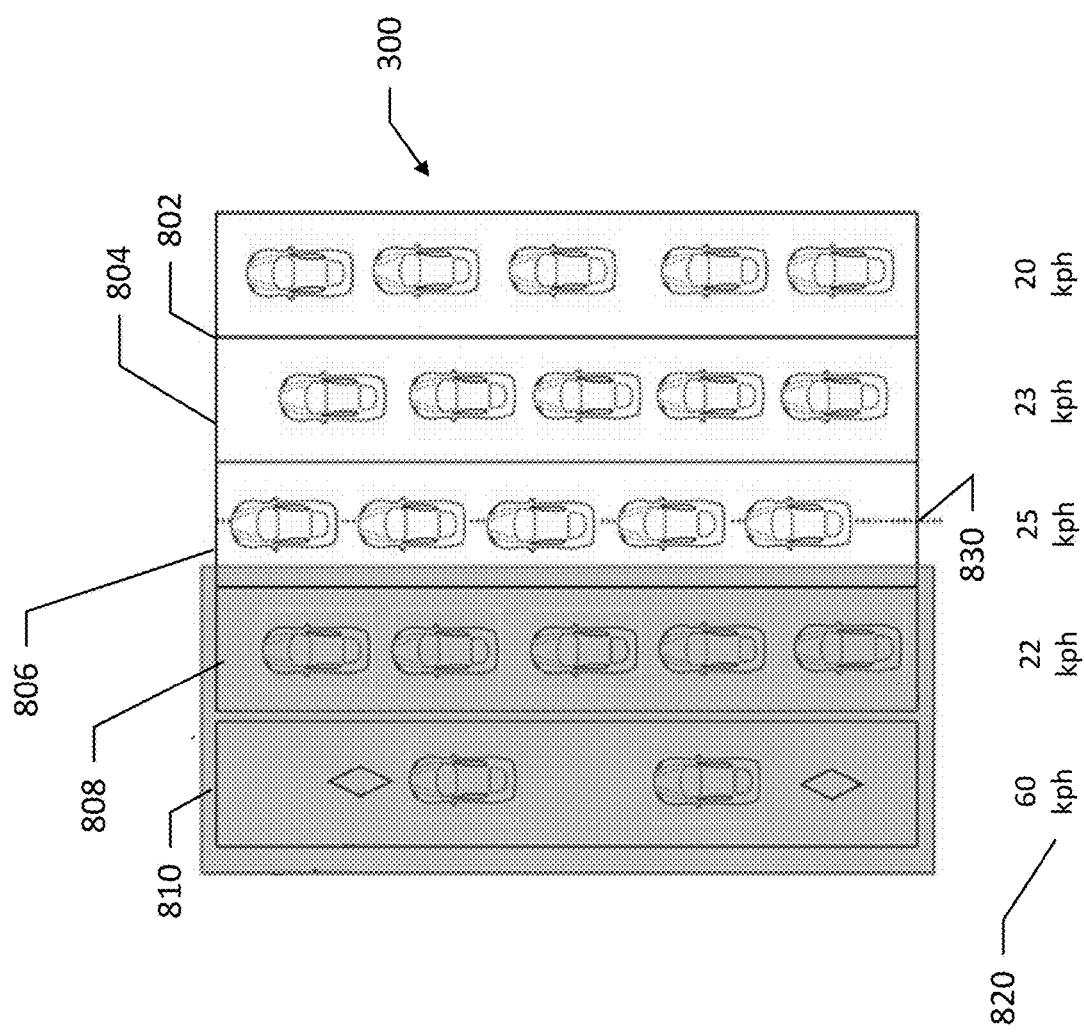
Figure 9:
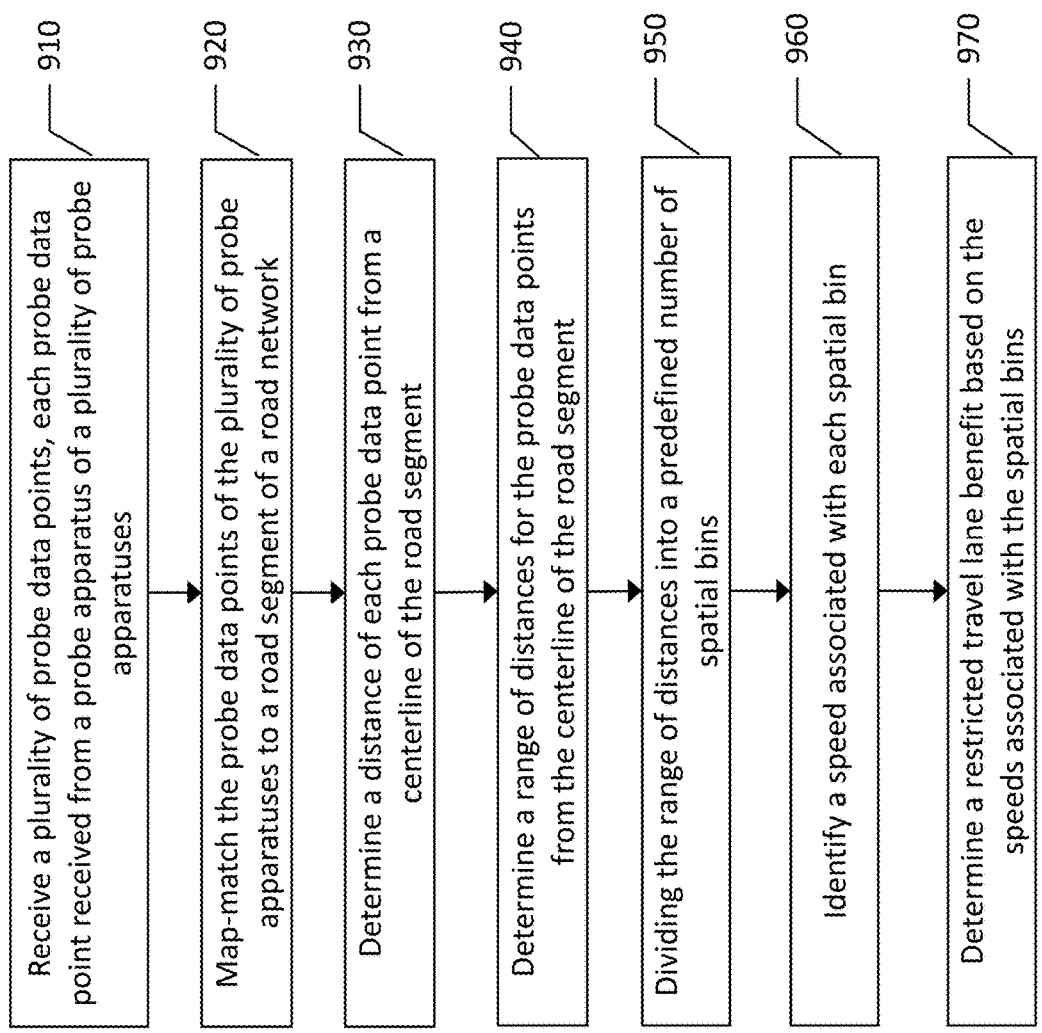

Having thus described example embodiments of the invention in general terms, reference will now be made to the accompanying drawings, which are not necessarily drawn to scale, and wherein:

FIG. 1 illustrates a communications diagram in accordance with an example embodiment of the present disclosure;

FIG. 2 is a block diagram of an apparatus that may be specifically configured for evaluating traffic conditions across a plurality of lanes to determine whether it is advantageous to travel in a restricted travel lane according to an example embodiment of the present disclosure;

FIG. 3 illustrates an example embodiment of a traffic scenario road segment of a road network, where the road segment includes a plurality of lanes as found in a multi-lane highway according to an example embodiment described herein;

FIG. 4 illustrates another example embodiment of a traffic scenario of a multi-lane highway according to an example embodiment of the present disclosure;

FIG. 5 illustrates a scenario in which the restricted travel lane is substantially faster than some through traffic lanes, but not all according to an example embodiment of the present disclosure;

FIG. 6 illustrates still another example embodiment of a traffic scenario of a multi-lane highway according to an example embodiment of the present disclosure;

FIG. 7 illustrates yet another example embodiment of a traffic scenario of a multi-lane highway according to an example embodiment of the present disclosure;

FIG. 8 illustrates the analysis of traffic along a road segment to establish if there is a restricted travel lane benefit according to an example embodiment of the present disclosure; and FIG. 9 is a flowchart of a method for establishing if there is a restricted travel lane benefit according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus, and computer program product are provided herein in accordance with an example embodiment for determining the benefit of a restricted travel lane relative to unrestricted travel lanes, and more particularly, to evaluating traffic conditions across a plurality of lanes to determine whether it is advantageous to travel in the restricted travel lane. Multi-lane highways, particularly in high-density urban and suburban areas often have restricted-access lanes such as High Occupancy Vehicle lanes or Express Lanes. High Occupancy Vehicle lanes or HOV lanes are restricted based on a number of occupants in a vehicle. Occasionally HOV lanes will have exceptions to the restriction that promote low emissions or other social and urban planning goals. For instance, HOV lanes may allow, in some cases, low- or zero-emissions vehicles regardless of the number of occupants. Such exceptions to a restriction may encourage the adoption of low- and zero-emissions vehicles. Further, motorcycles may be exempt from the occupant restriction and may be permitted in HOV lanes. Such an exception may encourage the adoption of motorcycle travel which is less problematic for traffic congestion.

Express lanes as described herein may include lanes that may be used based on a toll system, otherwise known as toll lanes, that are provided to function as higher-speed traffic lanes during times of congestion. These toll lanes may have dynamic tolls that are calculated based on traffic speeds and volumes and may optionally be based on time-of-day and day-of-week. Regardless of how the access is restricted, Express lanes, Toll lanes, HOV lanes, etc. are each types of "restricted travel lanes" that require certain criteria to be met to travel in such lanes. Violation of the restrictions, such as accessing a restricted travel lane without satisfying the restrictions, such as not having the requisite number of people in a vehicle to travel in an HOV lane or not having an electronic toll transponder to pay the tolls of a Toll lane may result in fines and penalties for the driver or owner of the vehicle violating the restriction. Other types of restricted travel lanes may include lanes restricted to public transit vehicles or ride-share vehicles, lanes restricted to emergency vehicles, or virtually any other type of restriction that precludes a portion of vehicle traffic from using the restricted travel lanes.

Restricted travel lanes are generally used to provide a benefit over normal travel lanes open to all traffic or "unrestricted lanes". Restricted travel lanes are intended to carry traffic at a higher rate of speed than unrestricted travel lanes during times of heavy traffic. The "unrestricted lanes" as described herein may have some degree of restriction, such as passenger vehicle traffic only (e.g., no trucks or commercial traffic); however, the difference between restricted travel lanes and unrestricted travel lanes as described herein is to delineate restricted travel lanes that are intended to be of higher average speed during times of heavy traffic from unrestricted travel lanes that are subject to typical heavy traffic slowdowns.

While restricted travel lanes generally provide a more reliable option for higher speed travel, it is not assured. HOV lanes may be traveled in without tolls based on occupancy of a vehicle, so the decision to travel in an HOV lane may not be a cost to a driver. However, Express lanes that include tolls may require a driver to weigh a cost-benefit decision. This cost-benefit decision may not be apparent to a driver when they are faced with a decision as to whether to enter the restricted travel lanes, as the restricted travel lanes may also have restricted access, where vehicles can only enter or leave the restricted travel lanes along certain portions of the roadway. This presents a greater issue of a cost-benefit decision to a driver as they may not be aware of what the benefit of the restricted travel lanes are relative to unrestricted travel lanes at any given time.

Embodiments of the present disclosure analyze traffic data and provide an indication of a benefit of using a restricted travel lane relative to the unrestricted lanes. Embodiments determine the benefit of a restricted travel lane relative to unrestricted travel lanes, and more particularly, evaluate traffic conditions across a plurality of lanes to determine whether it is advantageous to travel in the restricted travel lane. The determination may provide an indication to a driver of a vehicle as to the benefit of traveling in the restricted travel lanes relative to unrestricted travel lanes. Optionally, as further described below, the determination may provide guidance for an autonomous or semi-autonomous vehicle with regard to whether travel in a restricted travel lane is of benefit. Further, in the case of an autonomous or semi-autonomous vehicle, a user may be presented with a cost/benefit option to select, such as an option to save an estimated amount of time and what the cost of saving that estimated amount of time may be. A user may have a preference for always saving time at the expense of the tolls, having a threshold cost below which a time savings is always preferred, or a threshold amount of time above which cost is no object, for example.

FIG. 1 illustrates a communication diagram of an example embodiment of a system for implementing example embodiments described herein. The illustrated embodiment of FIG. 1 includes a map services provider system 116, a processing server 102 in data communication with a user equipment (UE) 104 and/or a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map services provider 116 may include computer systems and networks of a system operator. The processing server 102 may include the map database 108, such as a remote map server. The network may be wired, wireless, or any combination of wired and wireless communication networks, such as cellular, Wi-Fi, internet, local area networks, or the like.

The user equipment 104 may include a mobile computing device such as a laptop computer, tablet computer, mobile phone, smart phone, navigation unit, personal data assistant, watch, camera, or the like. Additionally or alternatively, the user equipment 104 may be a fixed computing device, such as a personal computer, computer workstation, kiosk, office terminal computer or system, or the like. Processing server 102 may be one or more fixed or mobile computing devices.

The user equipment 104 may be configured to access the map database 108 via the processing server 102 through, for example, a mapping application, such that the user equipment may provide navigational assistance to a user among other services provided through access to the map services provider 116.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) also known as a context associated with the POI data records or other records of the map database 108.

The map database 108 may be maintained by a content provider e.g., a map services provider in association with a services platform. By way of example, the map services provider can collect geographic data to generate and enhance the map database 108. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Also, remote sensing, such as aerial or satellite photography, can be used to generate map geometries directly or through machine learning as described herein. Further, crowd-sourced data from vehicles traveling along the road links in the road network may provide information relating to their respective speed of travel, which may inform the map services provider with respect to vehicle speeds, such as lane level vehicle speed profiles.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by user equipment 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map services provider. For example, a customer of the map services provider, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., user equipment 104) to provide navigation and/or map-related functions. For example, the map database 108 may be used with the end user device 104 to provide an end user with navigation features. In such a case, the map database 108 can be downloaded or stored on the end user device (user equipment 104) which can access the map database 108 through a wireless or wired connection, such as via a processing server 102 and/or the network 112, for example.

In one embodiment, the end user device or user equipment 104 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the user equipment 104 for navigation and map functions such as guidance and map display, for example, and for determination of one or more personalized routes or route segments based on one or more calculated and recorded routes, according to some example embodiments.

The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. While probe data is described herein as being vehicle probe data, example embodiments may be implemented with pedestrian probe data or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present disclosure for determining the benefit of a restricted travel lane relative to unrestricted travel lanes, and more particularly, to evaluating traffic conditions across a plurality of lanes to determine whether it is advantageous to travel in the restricted travel lane. The apparatus may include or otherwise be in communication with a processing circuitry 202, a memory device 204, a communication interface 206, and a user interface 208. In some embodiments, the processing circuitry (and/or co-processors or any other processing circuitry assisting or otherwise associated with the processing circuitry) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processing circuitry 202). The memory device may be configured to store information, data, content, applications, instructions, or the like, for enabling the apparatus to carry out various functions in accordance with an example embodiment of the present invention. For example, the memory device could be configured to buffer input data for processing by the processing circuitry. Additionally or alternatively, the memory device could be configured to store instructions for execution by the processing circuitry.

The processing circuitry 202 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processor may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 202 may be configured to execute instructions stored in the memory device 204 or otherwise accessible to the processing circuitry. Alternatively or additionally, the processing circuitry may be configured to execute hard coded functionality. As such, whether configured by hardware or software methods, or by a combination thereof, the processing circuitry may represent an entity (for example, physically embodied in circuitry) capable of performing operations according to an embodiment of the present invention while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of software instructions, the instructions may specifically configure the processing circuitry to perform the algorithms and/or operations described herein when the instructions are executed. However, in some cases, the processing circuitry may be a processor specific device (for example, a mobile terminal or a fixed computing device) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn be in communication with the processing circuitry 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processing circuitry may comprise user interface circuitry configured to control at least some functions of one or more user interface elements such as a display and, in some embodiments, a plurality of speakers, a ringer, one or more microphones and/or the like. The processing circuitry and/or user interface circuitry comprising the processor may be configured to control one or more functions of one or more user interface elements through computer program instructions (for example, software and/or firmware) stored on a memory accessible to the processing circuitry (for example, memory device 204, and/or the like).

Embodiments of the present disclosure may determine the benefit of traveling in a restricted travel lane relative to unrestricted travel lanes, and more particularly, to evaluating traffic conditions across a plurality of lanes to determine whether it is advantageous to travel in the restricted travel lane. Embodiments may further inform autonomous or semi-autonomous vehicles with respect to safe and efficient navigation through areas having restricted and unrestricted travel lanes. Embodiments provide insight into vehicle speeds along road segments of a road network, which can be used in real time or used for future epochs given the vehicle speeds and traffic conditions at historical epochs similar to a current epoch.

Road traffic conditions of a road segment may be reflected in the speed of traffic along that road segment. Changes in traffic conditions, such as congestion forming/ending occur because the number of vehicles on the road segment has risen/fallen below the road capacity, or as a result of upstream propagation of the effects of a road incident (e.g., accident, hazardous road conditions, etc.). In order to provide the highest quality road information to drivers, it is important to accurately detect locations of changing traffic conditions and use that traffic information to inform analysis of the best path along a route including lane-specific maneuvers.

Multi-lane highways that include restricted travel lanes are intended to provide an incentive through the restricted travel lanes by maintaining those lanes at a relatively higher speed than the unrestricted travel lanes. The restrictions may be passenger based (e.g. HOV lanes), cost based (e.g., Express lanes and/or toll lanes), or other restrictions designed to generate revenue or to encourage specific behavior (e.g., car pooling or commuting in low-emissions vehicles). These restricted travel lanes are not always beneficial to a driver.

FIG. 3 illustrates an example embodiment of a road segment 300 of a road network, where the road segment 300 includes a plurality of lanes as found in a multi-lane highway. As shown, the lanes include right-most lane 302, next right-most lane 304, center lane 306, a colloquially known "fast lane" or "passing lane" 308, and a restricted travel lane 310. According to the illustrated embodiment, all lanes are "jammed" or have substantial traffic. While the illustration depicts this traffic volumetrically, the determination of a traffic jam or traffic delay is established through speeds of travel. In the illustrated embodiment, each of lanes 302, 304, 306, 308, and 310 have an average speed that is very slow relative to the typical flow along the road segment and/or relative to the posted speed limit for the road segment. Average lane speeds 320 are shown below each respective lane. In this scenario, the restricted travel lane 310 would not provide substantial benefit to a driver seeking to improve their travel speed or reduce their travel time.

FIG. 4 illustrates the same road segment 300 including lanes 402, 404, 406, 408, and 410, where the restricted travel lane 410 is not jammed and is substantially free-flowing, where the speed in the restricted travel lane 410 is around or above the posted speed limit, and/or fast relative to the lanes 404, 406, and 408. While the restricted travel lane 410 indicates relatively fast average speed as compared to lanes 404, 406, and 408, the right-most lane 402 also has a relatively fast average speed. In this case, the restricted travel lane 410 may be faster than lanes 404, 406, and 408; however, the restricted travel lane 410 does not provide a substantial benefit relative to all other lanes as right-most lane 402. Said differently, a vehicle could be as efficient in a lane that is not the restricted travel lane 410 as would be traveling in the restricted travel lane. In this scenario, there is no restricted travel lane benefit since the right-most lane 402 is of substantially similar speed and efficiency. While this scenario may provide an indication of the benefit or lack thereof of a restricted travel lane, a faster speed in a right-most lane may not be indicative of a through-traffic lane having a speed faster than or comparable to a travel-restricted lane.

According to some embodiments, the comparison to the speeds on the side of the road opposite the side on which HOV lane is located is not necessary and can result in errors. For example, if a restricted travel lane is on a left side of the road, the goal is to make sure that the speeds on the left side of the road are distributed over a large range of speeds i.e. there are slower moving vehicles and faster moving vehicle. Further, to establish that most of the probes with fastest speeds are located as far left as possible. This indicates that the travel speed in the restricted travel lane is faster than the leftmost but non-restricted travel lane speeds, as shown in FIG. 8. If it was otherwise, i.e. the restricted travel lane traffic was moving slower than leftmost but non-restricted travel lane, the vehicles would abandon restricted travel lane and move into leftmost but non-restricted travel lane therefore equalizing the speeds on the left side of the road across multiple spatial bins. This is only not the case if restricted travel lane is physically separated from the leftmost but non-restricted travel lane and the vehicles in the restricted travel lane cannot exit it at any point.

At the same time, the traffic generally moves faster or at equal speeds the further is the lane from the right side of the road. This might not be true if there are accidents or construction in the lanes further to the left, but such a scenario is generally an anomaly and not considered by embodiments described herein. Embodiments described herein generally focus on the leftmost but non-restricted travel lane(s) and assume that all the other lanes on the road are moving at the same or lower speed. The only common exception scenario being if the rightmost lane on the road is an exit lane in which case it can have speeds that are faster than the other lanes on a multi-lane road when traffic congestion is present. Thus, as described herein, after comparison of the speeds in the restricted travel lane(s) to speeds in leftmost but non-restricted travel lane, which results in conclusion that the restricted travel lane is faster, it is unnecessary to compare lane speeds on a right side of the multi-lane road segment as it may occur that the travel-restricted lane is moving slower than an exit-only lane. A fast-moving exit only lane may falsely indicate that there is no benefit to using the restricted travel lane, when in reality, the restricted travel lane may be substantially faster than all other through-traffic lanes.

FIG. 5 illustrates a scenario in which the restricted travel lane 510 is substantially faster than some through traffic lanes, but not all. As shown, one of the available through traffic lanes 506 is traveling at a speed substantially similar to that of the restricted travel lane 510 as shown by average lane speeds 520. While lanes 502, 504, and 508 are each congested and traveling relatively slowly, the lane 506 travelling at a speed substantially similar to that of the restricted travel lane 510 renders no benefit to the restricted travel lane 510 over the non-restricted travel lanes.

FIG. 6 illustrates a scenario in which the restricted travel lane 610 of the road segment 300 is substantially faster than all other travel lanes including 602, 604, 606, and 608, with the average speeds of each lane shown at 620. In this scenario, there is a restricted travel lane benefit as the speed and efficiency of the restricted travel lane is substantially higher than all remaining lanes. The speeds described herein are described in relative terms, where a speed that is "relatively high" means that it is faster than a "relatively low" speed by a substantial amount, where a substantial amount may be proportional. For example, a speed of 35 kilometers per hour (kph) is not regarded as a "fast" speed; however, 35 kph is relatively fast as compared to 10 kph. Thus, "relatively high" means a proportionally faster speed than a "relatively low" speed, where the proportion may be configurable or predefined. Example proportions include two-to-one, for instance, where a speed of 70 kph is relatively high compared to a relatively low speed of 35 kph. The term "relatively high" may also mean a set value of speed larger than a "relatively low" speed. For example, a speed that is 50 kph higher than another speed is "relatively high" compared to the other speed, such as 70 kph is "relatively high" as compared to 20 kph, or 160 kph is relatively high as compared to 110 kph. Thus, the term "relatively high" is a term denoting that a speed is substantially greater than a "relatively low" speed, and the degree of difference that is substantial is at least 25%.

FIG. 7 illustrates another example embodiment where all travel lanes 702, 704, 706, 708, and 710 of road segment 300 are traveling at a speed that is close to or above a posted speed limit as shown in the average lane speed at 720 such that there is no restricted travel lane benefit.

While the embodiments of FIGS. 3-7 illustrate scenarios in which a benefit of travel in the restricted travel lane may or may not be present, conventional traffic monitoring fails to identify if there is a benefit to travel in a restricted travel lane. This is particularly true as lane speeds vary across a multi-lane highway and conventional traffic mapping may not recognize the differing patterns shown in FIGS. 3-7. Embodiments described herein provide a method of identifying when there is a benefit of traveling in the restricted travel lanes such that a driver or occupant of a vehicle can make an educated decision as to a cost-benefit analysis (if there is an associated cost) or if the benefit of traveling in the restricted travel lane is worth it to the driver or occupant.

To determine if a restricted travel lane is of benefit along a multi-lane highway, embodiments described herein collect probe data from probe apparatuses traveling along a road network. The probe apparatuses can be in the form of the apparatus of FIG. 2, which may be embodied as a mobile device or a vehicle itself, for example. The probe data points from the probes include at least a timestamp and a location (e.g., latitude and longitude). While speed information for a probe can be calculated from at least two probe data points with time and location, probe data points may include speed information for each individual probe data point.

Probe data points may be map-matched to road segments within the road network. Map matching may be performed according to various map-matching techniques. For a given road segment of a multi-lane highway having a restricted travel lane, the road segment includes a road segment centerline which may be previously established (e.g., stored within map data such as in map database 108) or established during the process described herein. Once the probe data points are map-matched to road segments, a distance for each probe data point is determined from the centerline of a respective road segment to which the probe data point is map-matched. The distance is a shortest distance of the probe data point to the centerline which is generally a distance perpendicular to the centerline of the road segment. While example embodiments described and illustrated herein recite a "centerline", any line along the road segment may be used, such as a line extending longitudinally along the road segment. Thus, while embodiments reference a centerline, it is appreciated that any other such line extending along the road segment may be used.

For a given road segment, a range of the distances for the probe data points from the centerline are determined. This range includes the probe data points furthest from the centerline on either side of the centerline, with probe data points considered outliers excluded. Outliers may be established based on a distribution of probe data points from the centerline of the road segment, such as the probe data points within a predefined standard deviation range of the centerline. The range, from one side of the centerline of the road segment to the other, is divided into a predefined number of spatial bins. The predefined number of spatial bins may correspond to the number of lanes of the road segment. Based on these spatial bins, probe data points may be assigned to the spatial bins based on their distance from the centerline of the road segment.

For each spatial bin, a speed may be determined from the probe data points grouped into the respective spatial bin. The speed may be established based on an average speed of the probe data points in the spatial bin. Optionally, outliers displaying unreasonable speeds of travel may be omitted from the speed calculation to ensure the speed established for each bin is accurate. These spatial bins represent lanes of the multi-lane road segment and the speeds determined for each bin reflects the average speed of the respective lane for the road segment. Using the speeds of the spatial bins, the traffic can be estimated on a per-lane basis.

According to example embodiments described herein, analysis of the speeds of the spatial bins can determine a restricted travel lane benefit. The restricted travel lanes are typically adjacent to a "fast lane" of a road segment. In the US, most of Europe, and many other countries, the restricted travel lanes are generally the left-most travel lanes. Conversely, in Japan, Australia, and the UK, among other countries, the restricted travel lanes are generally in the right-most lanes. Embodiments described herein are agnostic of the driving convention as they can be implemented regardless of lane directionality. Further, some restricted travel lanes may be adjacent the slowest lanes, or in the US, the right-most lanes. These restricted travel lanes may include bus lanes, for example. Embodiments described herein can be employed to determine the benefit of restricted travel lanes regardless of which side of the road the restricted travel lane is on.

To establish the benefit of travel in the restricted travel lane, the centerline 830 of the road segment may be used as shown in FIG. 8. The restricted travel lane 810 side of the road segment 300 is shown as shaded in FIG. 8. The analysis of example embodiments divides the road segment along the centerline and identifies if there are spatial bins on the restricted travel lane 810 side of the road segment with speeds corresponding to at least one relatively fast lane and at least one relatively slow lane present. Verifying that a relatively high speed spatial bin and a relatively slow speed spatial bin are present in the at least two spatial bins closest to the restricted travel lane 810 side of the road segment 300 confirms that a high speed lane is present on that side of the centerline. The average speed of travel in lanes 802, 804, 806, and 808 is relatively low. However, the analysis may rely only on the spatial bins shaded in FIG. 8 including lanes 808 and 810, presuming higher speed traffic generally is found in the left-most lanes. The analysis of some embodiments may further determine if there are any relatively high speed spatial bins on the opposite side of the centerline 830 of the road segment 300 from the restricted travel lane 810. As described above, identifying relatively high speed spatial bins on the opposite side of a centerline from the restricted travel lane may prove erroneous in some embodiments, thus may not be employed, particularly when exit lanes are present along a road segment.

A restricted travel lane benefit is determined to be present if, on the restricted travel lane 810 side of the centerline 830 there is a relatively high speed spatial bin (e.g., lane 810) and a relatively slow speed spatial bin (e.g., lane 808), and if, on the opposite side of the centerline 830 there are no relatively high speed spatial bins (e.g., lanes 802, 804), excepting exit lanes. If the centerline 830 of the road segment 300 bisects a center lane (e.g., when there is an odd number of lanes), the center spatial bin may be associated with the side of the centerline 830 opposite the restricted travel lane 810.

A restricted travel lane benefit is determined to not be present in circumstances such as those shown in FIGS. 3, 4, 5, and 7. For example, in the scenario of FIG. 3, all lanes are congested, such that there is no relatively high speed spatial bin on the restricted travel lane 310 side of the centerline 330 as there are only relatively slow speed spatial bins. Similarly, on the opposite side of the centerline from the restricted travel lane 310, there are only relatively slow speed spatial bins. Thus, there is no restricted travel lane benefit. In the scenario of FIG. 4, while there is a relatively high speed spatial bin and a relatively slow speed spatial bin on the side of the centerline 330 of the restricted travel lane 310, there is also a relatively high speed lane (lane 302) on the side of the centerline 330 opposite that of the restricted travel lane 310. Thus, there is no restricted travel lane benefit. In the scenario of FIG. 5, a lane other than the restricted travel lane has an average speed substantially similar to that of the restricted travel lane. According to the scenario of FIG. 7, all lanes have relatively high speed, such that there are no spatial bins with relatively slow speeds. Thus, there is no restricted travel lane benefit.

FIG. 9 illustrates a flowchart depicting a method according to example embodiments of the present invention. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processing circuitry 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

FIG. 9 illustrates a flowchart of a method to determine the benefit of traveling in a restricted travel lane relative to unrestricted travel lanes, and more particularly, to evaluating traffic conditions across a plurality of lanes to determine whether it is advantageous to travel in the restricted travel lane. As shown at 910, a plurality of probe data points are received, each probe data point received from a probe apparatus of a plurality of probe apparatuses. The probe data points may each include a timestamp and a location (e.g., latitude and longitude) along with an indication of a speed of the probe data point. Optionally, speed of a probe data point may be established based on a pair of probe data points using the timestamp and locations of the probe data points to establish a speed therebetween. At 920, the probe data points are map matched to a road segment of a road network. A distance is determined between each probe data point and a centerline of the road segment as shown at 930. This indicates the offset of a probe data point from a centerline of a road to provide an indication of which lane a vehicle represented by the probe data point is traveling. A range of distances is determined at 940 for the probe data points from the centerline of the road segment, and that range of distances is divided at 950 into a predefined number of spatial bins. These spatial bins may represent the lanes of the road segment, and probe data points may be associated with respective bins based on their distance from the centerline.

At 960, a speed is associated with each spatial bin. This speed may be established based on an average speed of the probe data points associated with the respective spatial bin. A restricted travel lane benefit may be determined at 970 in response to the speed associated with each of at least two of the spatial bins on a predetermined side of the centerline of the road segment including at least one relatively high speed and at least one relatively low speed, and in response to the first bin corresponding to a lane furthest from the line extending longitudinally along the road segment. The restricted travel lane benefit may be established as a recommendation to a driver or occupant of a vehicle that traveling in the restricted travel lane is recommended for efficiency.

In an example embodiment, an apparatus for performing the method of FIG. 9 above may comprise a processor (e.g., the processing circuitry 202) configured to perform some or each of the operations (910-970) described above. The processing circuitry may, for example, be configured to perform the operations (910-970) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 910-970 may comprise, for example, the processing circuitry 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising processing circuitry and at least one memory including computer program code, the at least one memory and computer program code configured to, with the processing circuitry, cause the apparatus to at least:

receive a plurality of probe data points, each probe data point received from a probe apparatus of a plurality of probe apparatuses;

map-match the plurality of probe data points of the plurality of probe apparatuses to a road segment of a road network;

determine a distance of each probe data point from a line extending longitudinally along the road segment;

determine a range of distances for the plurality of probe data points from the line extending longitudinally along the road segment;

divide the range of distances into a predefined number of spatial bins;

identify a speed associated with each spatial bin;

determine a restricted travel lane benefit in response to (i) the speed associated with each of at least two spatial bins on a predetermined side of the line extending longitudinally along the road segment including a first speed for a first bin of the at least two spatial bins and a second speed for a second bin of the at least two spatial bins, where the first speed is at least a predetermined amount faster than the second speed and in response to the first bin corresponding to a lane furthest from the line extending longitudinally along the road segment, and (ii) the speed associated with any spatial bin other than the at least two spatial bins failing to be substantially similar to the first speed; and provide an indication of the restricted travel lane benefit to an occupant of a vehicle and a cost associated with the restricted travel lane benefit.

2. The apparatus of claim 1, wherein each probe data point comprises a speed, wherein causing the apparatus to identify a speed associated with each spatial bin comprises causing the apparatus to:

assign respective probe data points to a respective spatial bin based on a distance of the respective probe data points from the line extending longitudinally along the road segment; and calculate an average speed of the respective probe data points assigned to each spatial bin to identify the speed associated with each spatial bin.

3. The apparatus of claim 1, wherein the predetermined amount comprises twenty-five percent.

4. The apparatus of claim 1, wherein the road segment comprises a multi-lane road segment having at least one restricted travel lane.

5. The apparatus of claim 4, wherein the predetermined side of the line extending longitudinally along the road segment comprises the at least one restricted travel lane.

6. The apparatus of claim 1, wherein the apparatus is further caused to provide at least one of:

route guidance to at least one of a driver of a vehicle; or an autonomous control of a vehicle based on the restricted travel lane benefit.

7. The apparatus of claim 1, wherein substantially similar to the first speed comprises within 25% of the first speed, wherein a restricted travel lane benefit is determined to not be present in response to the speed associated with any spatial bin other than the at least two spatial bins being substantially similar to the first speed.

8. A computer program product comprising at least one non-transitory computer-readable storage medium having computer-executable program code portions stored therein, the computer-executable program code portions comprising program code instructions configured to:

receive a plurality of probe data points, each probe data point received from a probe apparatus of a plurality of probe apparatuses;

map-match the plurality of probe data points of the plurality of probe apparatuses to a road segment of a road network;

determine a distance of each probe data point from a line extending longitudinally along the road segment;

determine a range of distances for the plurality of probe data points from the line extending longitudinally along the road segment;

divide the range of distances into a predefined number of spatial bins;

identify a speed associated with each spatial bin;

determine a restricted travel lane benefit in response to (i) the speed associated with each of at least two spatial bins on a predetermined side of the line extending longitudinally along the road segment including a first speed for a first bin of the at least two spatial bins and a second speed for a second bin of the at least two spatial bins, where the first speed is at least a predetermined amount faster than the second speed, and in response to the first bin corresponding to a lane furthest from the line extending longitudinally along the road segment, and (ii) the speed associated with any spatial bin other than the at least two spatial bins failing to be substantially similar to the first speed; and provide an indication of the restricted travel lane benefit to an occupant of a vehicle and a cost associated with the restricted travel lane benefit.

9. The computer program product of claim 8, wherein each probe data point comprises a speed, wherein the program code instructions to identify a speed associated with each spatial bin comprise program code instructions to:

assign respective probe data points to a respective spatial bin based on a distance of the respective probe data points from the line extending longitudinally along the road segment; and calculate an average speed of the respective probe data points assigned to each spatial bin to identify the speed associated with each spatial bin.

10. The computer program product of claim 8, wherein the predetermined amount comprises twenty-five percent.

11. The computer program product of claim 8, wherein the road segment comprises a multi-lane road segment having at least one restricted travel lane.

12. The computer program product of claim 11, wherein the predetermined side of the line extending longitudinally along the road segment comprises the at least one restricted travel lane.

13. The computer program product of claim 8, further comprising program code instructions to provide route guidance to at least one of:

a driver of a vehicle; or an autonomous control of a vehicle based on the restricted travel lane benefit.

14. The computer program product of claim 8, wherein substantially similar to the first speed comprises within 25% of the first speed, wherein a restricted travel lane benefit is determined to not be present in response to the speed associated with any spatial bin other than the at least two spatial bins being substantially similar to the first speed.

15. A method comprising:

receiving a plurality of probe data points, each probe data point received from a probe apparatus of a plurality of probe apparatuses;

map-matching the plurality of probe data points of the plurality of probe apparatuses to a road segment of a road network;

determining a distance of each probe data point from a line extending longitudinally along the road segment;

determining a range of distances for the plurality of probe data points from the line extending longitudinally along the road segment;

dividing the range of distances into a predefined number of spatial bins;

identifying a speed associated with each spatial bin;

determining a restricted travel lane benefit in response to (i) the speed associated with each of at least two spatial bins on a predetermined side of the line extending longitudinally along the road segment including a first speed for a first bin of the at least two spatial bins and a second speed for a second bin of the at least two spatial bins, where the first speed is at least a predetermined amount faster than the second speed, and in response to the first bin corresponding to a lane furthest from the line extending longitudinally along the road segment, and (ii) the speed associated with any spatial bin other than the at least two spatial bins failing to be substantially similar to the first speed; and providing an indication of the restricted travel lane benefit to an occupant of a vehicle and a cost associated with the restricted travel lane benefit.

16. The method of claim 15, wherein each probe data point comprises a speed, wherein identifying a speed associated with each spatial bin comprises:

assigning respective probe data points to a respective spatial bin based on a distance of the respective probe data points from the line extending longitudinally along the road segment; and calculating an average speed of the respective probe data points assigned to each spatial bin to identify the speed associated with each spatial bin.

17. The method of claim 15, wherein the road segment comprises a multi-lane road segment having at least one restricted travel lane.

18. The method of claim 17, wherein the predetermined side of the line extending longitudinally along the road segment comprises the at least one restricted travel lane.

19. The method of claim 15, further comprising providing route guidance to at least one of:

a driver of a vehicle; or an autonomous control of a vehicle based on the restricted travel lane benefit.

20. The method of claim 15, wherein substantially similar to the first speed comprises within 25% of the first speed, wherein a restricted travel lane benefit is determined to not be present in response to the speed associated with any spatial bin other than the at least two spatial bins being substantially similar to the first speed.

* * * * *